(12) United States Patent
Kakuwa

(10) Patent No.: US 10,693,173 B2
(45) Date of Patent: Jun. 23, 2020

(54) FUEL CELL DEVICE

(71) Applicant: Panasonic Intellectual Property Management Co., Ltd., Osaka (JP)

(72) Inventor: Takashi Kakuwa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 141 days.

(21) Appl. No.: 15/800,069

(22) Filed: Nov. 1, 2017

(65) Prior Publication Data

US 2018/0138540 A1    May 17, 2018

(30) Foreign Application Priority Data

Nov. 15, 2016 (JP) .................................. 2016-222600

(51) Int. Cl.
*H01M 8/2475* (2016.01)
*H01M 8/0247* (2016.01)
(Continued)

(52) U.S. Cl.
CPC ....... *H01M 8/2475* (2013.01); *H01M 8/0247* (2013.01); *H01M 8/0273* (2013.01);
(Continued)

(58) Field of Classification Search
CPC ............. H01M 8/2475; H01M 8/0247; H01M 8/0273; H01M 8/0276; H01M 8/2425;
(Continued)

(56) References Cited

U.S. PATENT DOCUMENTS 6,344,290 B1   2/2002  Bossel
2004/0121216 A1*  6/2004  Blanchet ............... H01M 8/248
                                                            429/470
(Continued)

FOREIGN PATENT DOCUMENTS

JP    2000-340249    12/2000
JP    2006-179288     7/2006

OTHER PUBLICATIONS

The Extended European Search Report dated Jan. 2, 2018 for the related European Patent Application No. 17200952.4.

*Primary Examiner* — Brian R Ohara
(74) *Attorney, Agent, or Firm* — McDermott Will & Emery LLP

(57) ABSTRACT

A fuel cell device includes: a fuel cell stack having a plurality of stacked unit cells; a first current collector and a second current collector which are arranged so as to have the fuel cell stack sandwiched therebetween in a stacking direction of the unit cells; a housing which stores the fuel cell stack, the first current collector, and the second current collector; a conductive first fastening member which is electrically connected to the second current collector, extends from the second current collector toward a side where the first current collector is disposed along the stacking direction, and has a first protrusion protruding from inside the housing to outside the housing; and a first elastic member which is provided at the first protrusion of the first fastening member so as to elastically bias the second current collector toward the first current collector via the first fastening member.

6 Claims, 13 Drawing Sheets

(51) Int. Cl.
*H01M 8/0273* (2016.01)
*H01M 8/0276* (2016.01)
*H01M 8/2425* (2016.01)
*H01M 8/248* (2016.01)
*H01M 8/2432* (2016.01)
*H01M 8/04014* (2016.01)
*H01M 8/124* (2016.01)

(52) U.S. Cl.
CPC ......... *H01M 8/0276* (2013.01); *H01M 8/248* (2013.01); *H01M 8/2425* (2013.01); *H01M 8/04014* (2013.01); *H01M 8/2432* (2016.02); *H01M 2008/1293* (2013.01); *Y02P 70/56* (2015.11)

(58) Field of Classification Search
CPC ............... H01M 8/248; H01M 8/2432; H01M 8/04014; H01M 2008/1293; Y02P 70/56
See application file for complete search history.

(56) References Cited

U.S. PATENT DOCUMENTS

| | | | |
|---|---|---|---|
| 2006/0204820 A1* | 9/2006 | Cho | H01M 8/0247 429/456 |
| 2007/0087237 A1* | 4/2007 | An | H01M 8/04552 429/432 |
| 2007/0281190 A1 | 12/2007 | Stelter | |
| 2008/0085435 A1 | 4/2008 | Dan | |

* cited by examiner

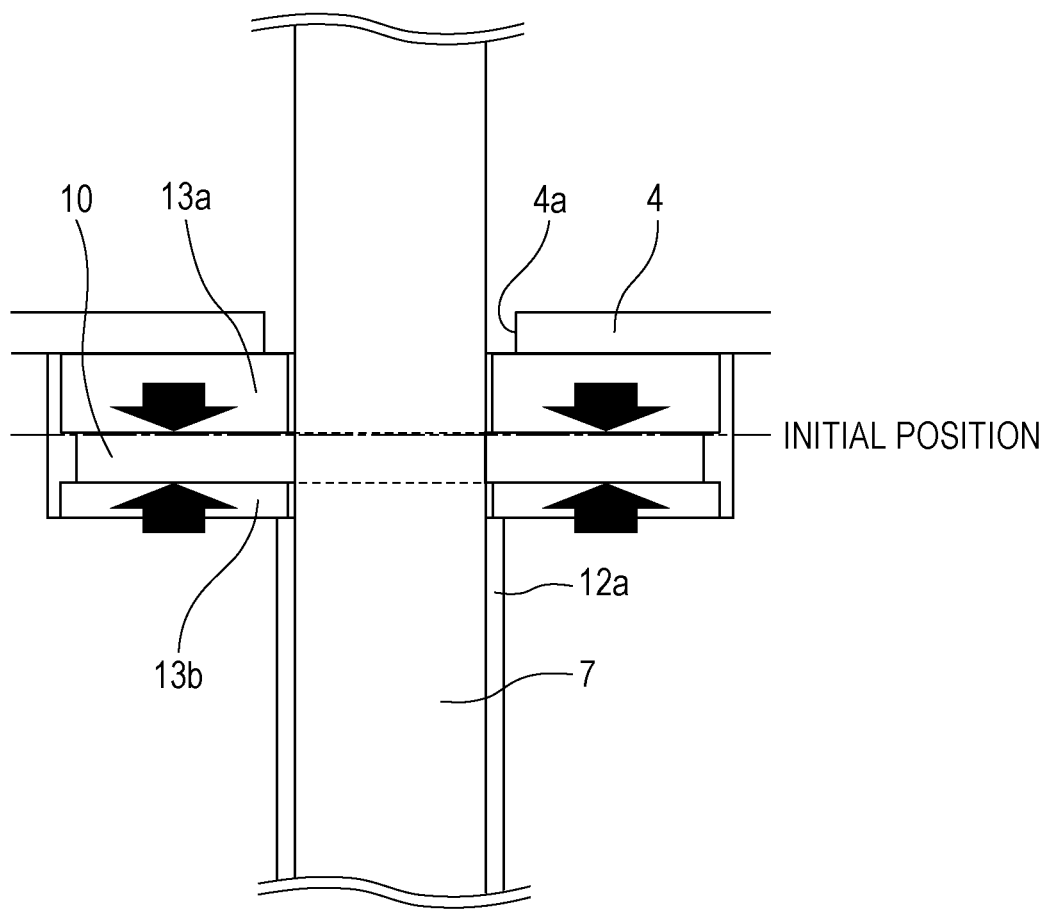

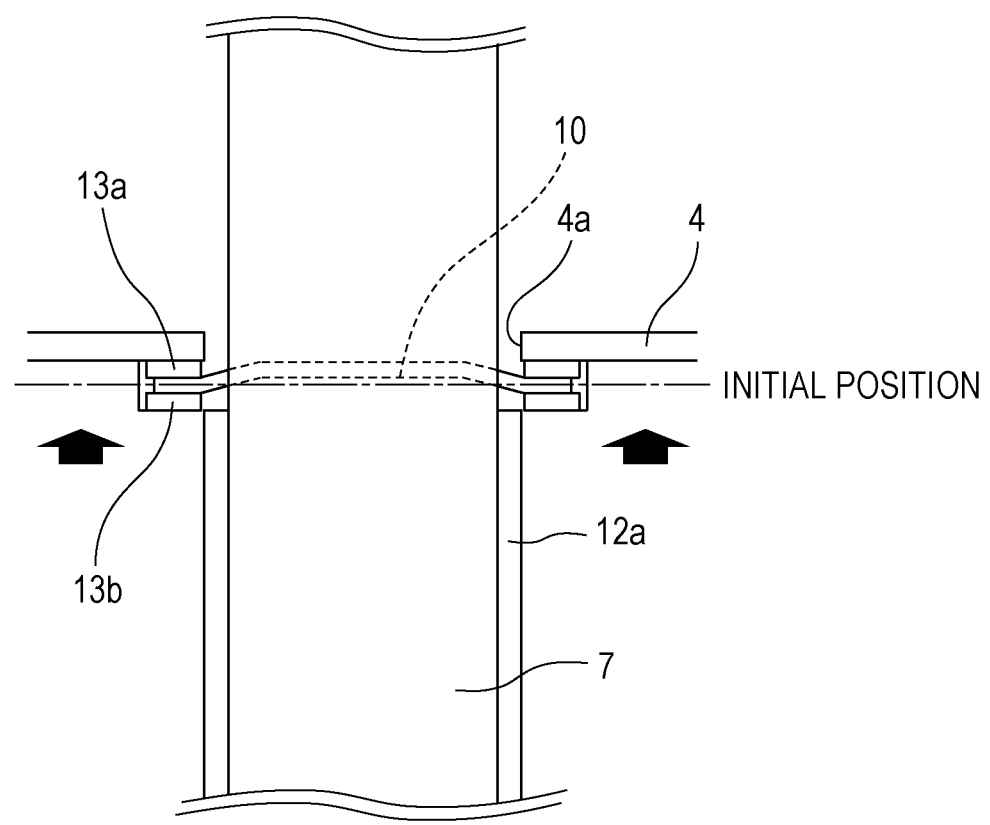

PRIOR ART    FIG. 9
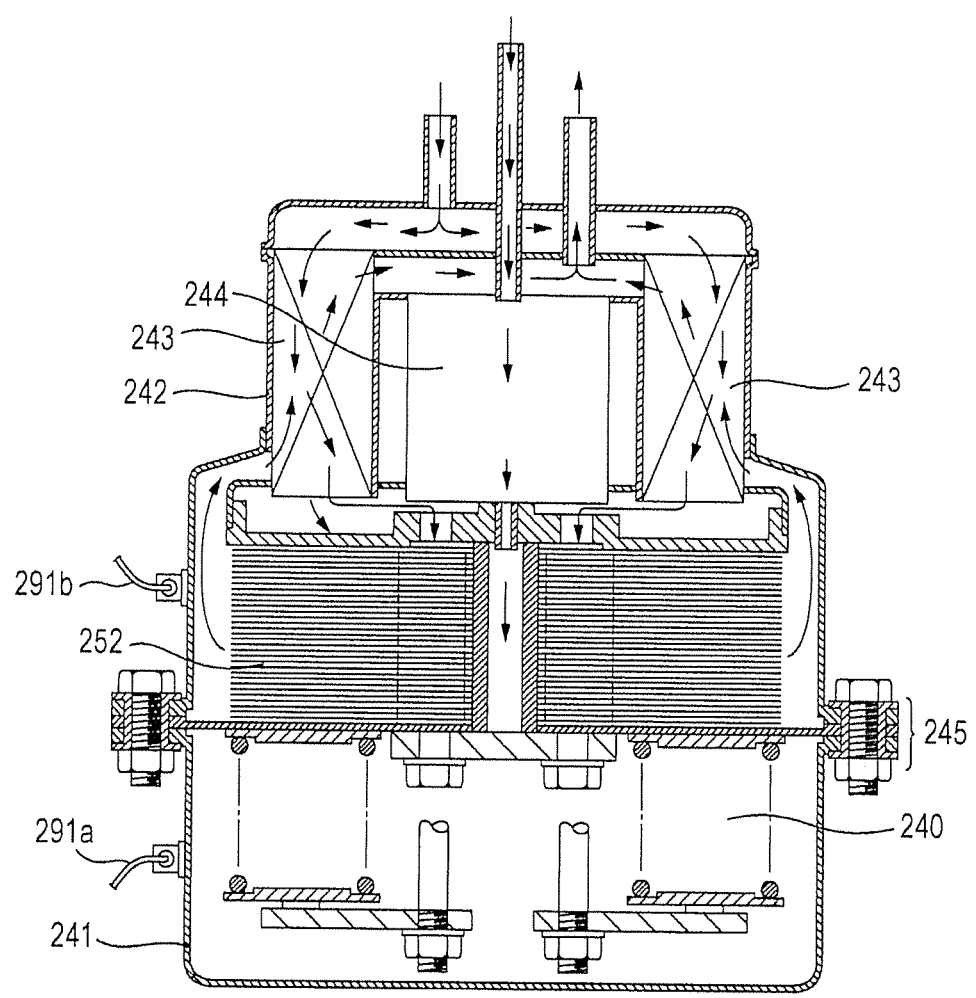

FUEL CELL DEVICE

BACKGROUND

1. Technical Field

The present disclosure relates to a fuel cell device including a fuel cell stack having a plurality of piled unit cells.

2. Description of the Related Art

A fuel cell cannot obtain high generated power output only with one unit cell. For this reason, a fuel cell achieves high generated power output by stacking (piling) a plurality of unit cells. Hereinafter, a structure obtained by stacking unit cells will be referred to as a fuel cell stack. The fuel cell stack needs to maintain gas sealability between unit cells, and achieve a reduction in electrical contact resistance and maintain good current collectability. If the shape of each of unit cells constituting the fuel cell stack is, for example, a flat plate shape, a load of predetermined magnitude needs to be applied to the entire fuel cell stack along a stacking direction of the unit cells. For this reason, a fuel cell needs a load applying mechanism for applying uniform pressure on the entire fuel cell stack. The fuel cell also needs a conductive member for extracting generated power from a current collecting section provided at the fuel cell stack to the outside. Examples of a fuel cell device having the above-described load applying mechanism and conductive member include the fuel cell devices disclosed in Japanese Unexamined Patent Application Publication Nos. 2000-340249 and 2006-179288.

As shown in FIG. 8, in the fuel cell device according to Japanese Unexamined Patent Application Publication No. 2000-340249, an upper clamping plate 116 and a lower clamping plate 117 are connected by fastening bolts 118, and a nut 188 mounted on each fastening bolt 118 is tightened to apply pressure on a fuel cell stack 114. A current cable 119 connected to the fuel cell stack 114 is inserted in the fastening bolt 118 and extends to the outside. FIG. 8 is a cross-sectional view showing the configuration of a fuel cell device according to the related art. An upper side of the current cable 119 is connected to a current terminal 120 at a top portion of the fuel cell stack 114 via an upper cable 121 while a lower side of the current cable 119 is connected to a current extraction port 122 provided at a pressure vessel 113 via a lower cable 123.

As shown in FIG. 9, the fuel cell device according to Japanese Unexamined Patent Application Publication No. 2006-179288 has a configuration in which a conductive first housing section 241 having a load applying mechanism 240 disposed therein and a conductive second housing section 242 having a fuel cell stack 252, a heat exchanger 243, and a reformer 244 built-in are screwed together via insulating members 245. FIG. 9 is a cross-sectional view showing the configuration of a fuel cell device according to the related art.

In the fuel cell device according to Japanese Unexamined Patent Application Publication No. 2006-179288, one pole of the fuel cell stack 252 is electrically connected to the first housing section 241 having conductivity while the other pole of the fuel cell stack 252 is connected to the conductive second housing section 242 via the heat exchanger 243 and the reformer 244. A current can be extracted from a first current extraction terminal 291a provided at the first housing section 241 and a second current extraction terminal 291b provided at the second housing section 242.

SUMMARY

However, the conventional fuel cell devices disclosed in Japanese Unexamined Patent Application Publication Nos. 2000-340249 and 2006-179288 suffer from the problem of the incapability of having a compact configuration and reducing manufacturing cost.

One non-limiting and exemplary embodiment provides a fuel cell device capable of having a compact configuration and reducing manufacturing cost.

In one general aspect, the techniques disclosed here feature a fuel cell device including: a fuel cell stack having a plurality of stacked unit cells; a first current collector and a second current collector which are arranged such that the fuel cell stack is sandwiched between the first current collector and the second current collector in a stacking direction of the unit cells; a housing which stores the fuel cell stack, the first current collector, and the second current collector; a conductive first fastening member which is electrically connected to the second current collector, extends from the second current collector toward the first current collector in the stacking direction of the unit cells, and has a first protrusion protruding from inside the housing to outside the housing; and a first elastic member which is provided at the first protrusion of the first fastening member so as to elastically bias the second current collector toward the first current collector via the first fastening member.

The present disclosure is configured in the above-described manner and produces the effect of having a compact configuration and reducing manufacturing cost.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4C is a cross-sectional view schematically showing a positional relationship among the bottom of the housing, the jut, and the first sealing material and the second sealing material provided on the jut in the fuel cell device shown in FIG. 3;

FIG. 5B is a view showing the modification of the fuel cell device shown in FIG. 3 and is a cross-sectional view schematically showing a positional relationship among the bottom of the housing, the jut, and the first sealing material and the second sealing material provided on the jut;

FIG. 9 is a cross-sectional view showing the configuration of a fuel cell device according to the related art.

DETAILED DESCRIPTION

Figure 1:
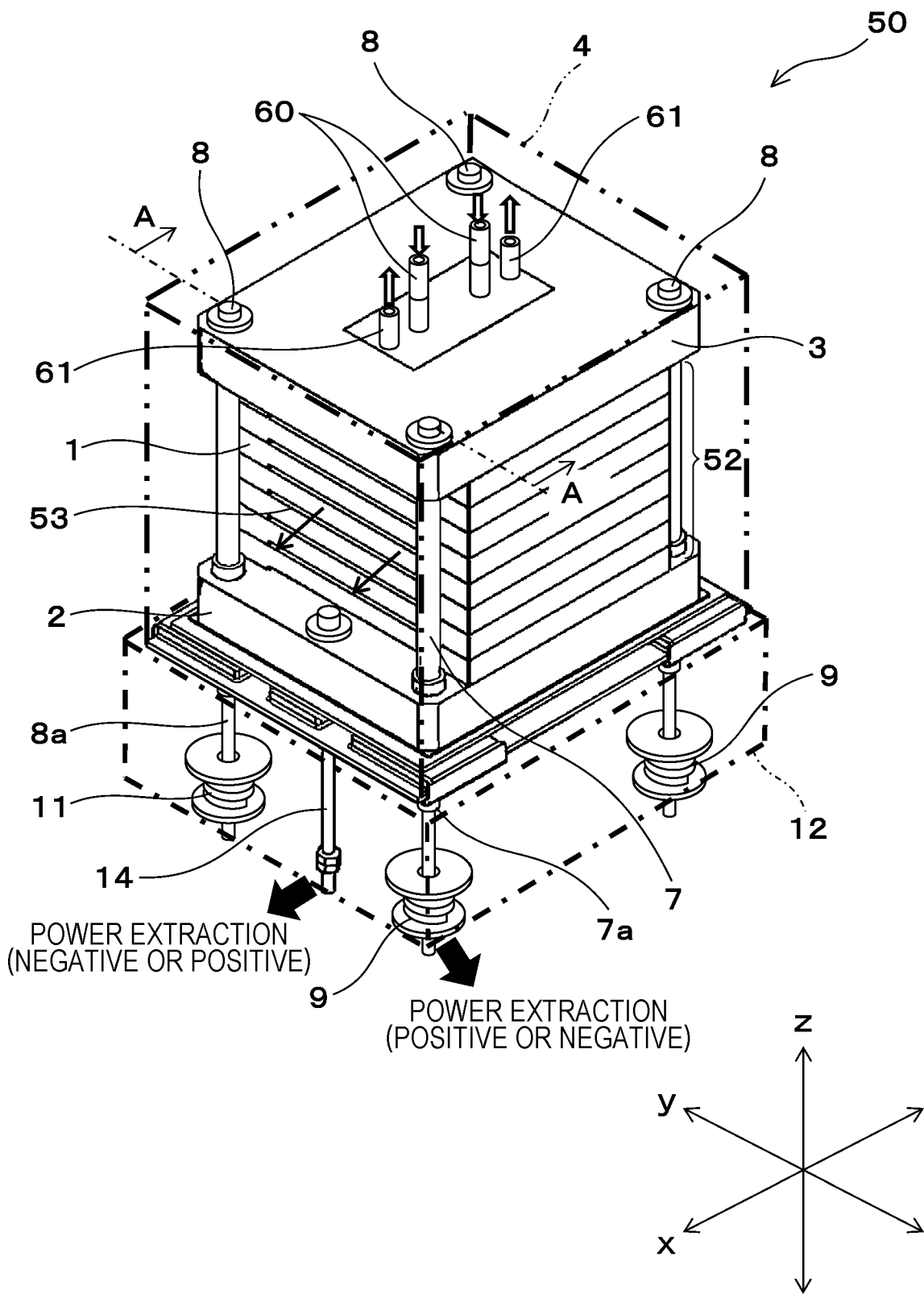
FIG. 1 is a perspective view showing a fuel cell device according to a first embodiment of the present disclosure.

Underlying Knowledge Forming Basis of One Form of the Present Disclosure

The present inventors have conducted intensive studies on the fuel cell devices disclosed in Japanese Unexamined Patent Application Publication Nos. 2000-340249 and 2006-179288 and have found the problem of the incapability of achieving compactification of the fuel cell devices and reducing the manufacturing costs of the fuel cell devices.

That is, the fuel cell device disclosed in Japanese Unexamined Patent Application Publication No. 2000-340249 is configured such that power is extracted via the current cable 119 inserted in the fastening bolt 118. To reduce power loss due to electrical resistance, the cross-sectional area of the current cable 119 needs to be maximized. An increase in the cross-sectional area of the current cable 119 requires an increase in the opening size of the fastening bolt 118, in which the current cable 119 is to be inserted. The fuel cell device has been found to suffer from the problem of an increase in the size of the entire fuel cell device with the increase in the opening size of the fastening bolt 118. The increase in the opening size of the fastening bolt 118 makes heat easier to conduct to outside the pressure vessel 113 via the fastening bolt 118, the current extraction port 122, and the like. For this reason, the fuel cell device disclosed in Japanese Unexamined Patent Application Publication No. 2000-340249 also suffers from the problem of an increase in heat loss inside the pressure vessel 113.

The current cable 119 arranged inside the fastening bolt 118 is exposed to a high temperature of 600° C. or more in the case of, for example, an SOFC. For this reason, to prevent a copper wire or the like, of which the current cable 119 is composed, from melting, the fuel cell device disclosed in Japanese Unexamined Patent Application Publication No. 2000-340249 is provided with a purge gas supply port 124 and is configured to cause purge gas to circulate through the fastening bolt 118 via the purge gas supply port 124. Thus, the fuel cell device according to Japanese Unexamined Patent Application Publication No. 2000-340249 has been found to suffer from the problem of an increase in manufacturing cost with an increase in configuration complexity.

The fuel cell device according to Japanese Unexamined Patent Application Publication No. 2000-340249 is configured such that the upper clamping plate 116 and the lower clamping plate 117 are connected by the fastening bolts 118 and such that the nut 188 mounted on each fastening bolt 118 is tightened to apply pressure on the fuel cell stack 114. For this reason, it has been found that the fuel cell device has difficulty in continuing to apply a fixed load on constituent members of the fuel cell stack 114 which expand and contract in response to a temperature change and suffers from the problem of the incapability of appropriately applying pressure on the fuel cell stack 114.

The fuel cell device according to Japanese Unexamined Patent Application Publication No. 2006-179288 is configured such that power generated by the fuel cell stack 252 is extracted to the outside via the first housing section 241 and the second housing section 242 that have conductivity. For this reason, the first housing section 241 and the second housing section 242 need to be appropriately insulated from the outside. However, as shown in FIG. 9, the fuel cell device according to Japanese Unexamined Patent Application Publication No. 2006-179288 is structured such that piping or the like for supplying air, fuel, water, and the like is provided at the second housing section 242. The fuel cell device has been found to suffer from the problem of the difficulty in appropriately insulating the entire first housing section 241 and the entire second housing section 242.

The fuel cell device is configured such that the load applying mechanism 240 is stored in the first housing section 241 and suffers from the problem of the larger size of the entire fuel cell device than, for example, a configuration in which only the load applying mechanism 240 is provided outside the first housing section 241. Additionally, the load applying mechanism 240 is arranged below the fuel cell stack 252, and the load applying mechanism 240 and the fuel cell stack 252 are separated by the thin insulating members 245 poor in thermal insulation. For example, if the fuel cell is an SOFC, heat of the high-temperature fuel cell stack 252 at 600° C. or more puts the load applying mechanism 240 in a high-temperature environment. Thus, the load applying mechanism 240 needs to be constructed using a heat-resistant, expensive ceramic spring or the like, and the fuel cell device has been found to suffer from the problem of high manufacturing cost.

As a result of intensive studies for solving the problems, the present inventors have obtained the knowledge below. That is, a fastening member for fastening a fuel cell stack is made to double as a power extractor for extracting power from the fuel cell stack. The present inventors have found that this configuration allows a fuel cell device to have a compact configuration and reduce the manufacturing cost of the fuel cell device and have arrived at the present disclosure. The present disclosure provides the aspects below.

A fuel cell device according to a first aspect of the present disclosure includes: a fuel cell stack having a plurality of stacked unit cells; a first current collector and a second current collector which are arranged such that the fuel cell stack is sandwiched between the first current collector and the second current collector in a stacking direction of the unit cells; a housing which stores the fuel cell stack, the first current collector, and the second current collector; a conductive first fastening member which is electrically connected to the second current collector, extends from the second current collector toward the first current collector in the stacking direction of the unit cells, and has a first protrusion protruding from inside the housing to outside the housing; and a first elastic member which is provided at the first protrusion of the first fastening member so as to elastically bias the second current collector toward the first current collector via the first fastening member.

Since the above-described configuration includes the first fastening member and the first elastic member, the second current collector can be elastically biased toward the first current collector along the stacking direction of the unit cells. It is thus possible to apply a load in the stacking direction of the unit cells and fasten the plurality of unit cells. Since the first fastening member has conductivity and is electrically connected to the second current collector, power generated in the fuel cell stack can be extracted from the second current collector to the outside via the first fastening member. It is thus possible to achieve device configuration compactification and reduce manufacturing cost, as compared with a configuration including a fastening member which fastens the plurality of unit cells and an extractor which extracts power from the second current collector as separate members.

The first elastic member is provided at the first protrusion outside the housing. It is thus possible to reduce the size of the housing and achieve device configuration compactification, as compared with a configuration in which the first elastic member is also stored in the housing. Note that, in the presence of a mount on which a fuel cell device according to the present disclosure is to be placed, further device configuration compactification can be achieved by storing the first elastic member in, for example, a space of the mount.

Thus, the fuel cell device according to the first aspect of the present disclosure can produce the effect of having a compact configuration and reducing manufacturing cost.

The fuel cell device according to a second aspect of the present disclosure, in the first aspect, may further include a second fastening member which extends from the second current collector toward the side where the first current collector is disposed in parallel with the first fastening member and has a second protrusion protruding from inside the housing to outside the housing, and a second elastic member which is provided at the second protrusion of the second fastening member so as to elastically bias the second current collector toward the first current collector via the second fastening member.

The above-described configuration further includes the second elastic member. It is thus possible to apply a sufficient load to the fuel cell stack and apply a uniform load to the entire fuel cell stack.

The fuel cell device according to a third aspect of the present disclosure, in the second aspect, may further include a first end member which is arranged on a side of the first current collector opposite to a side where the fuel cell stack is disposed, and a second end member which is arranged on a side of the second current collector opposite to a side where the fuel cell stack is disposed, respective ends of the first fastening member and the second fastening member may be coupled to the second end member, and the second end members may apply pressure on the fuel cell stack toward the first end member in the stacking direction of the unit cells with force exerted from the first elastic member and the second elastic member via the first fastening member and the second fastening member.

In the above-described configuration, the first end member is arranged on an outer side (on the side opposite to the side where the fuel cell stack is disposed) of the first current collector, and the second end member is arranged on an outer side (on the side opposite to the side where the fuel cell stack is disposed) of the second current collector. For this reason, the fuel cell device can electrically insulate the fuel cell stack, the first current collector, and the second current collector from the housing that stores the components, using the first end member and the second end member. This eliminates the need to take into consideration a distance for insulation from the fuel cell stack, the material for a different member arranged in the vicinity of the housing, and the like, and a simpler inexpensive configuration can be adopted.

The fuel cell device according to a fourth aspect of the present disclosure, in the second or third aspect, may be configured such that, in the first fastening member, a cross-sectional area of the first protrusion is smaller than a cross-sectional area of a portion inside the housing.

In the above-described configuration, the first protrusion protruding from the housing is smaller in cross-sectional area than the portion inside the housing in the first fastening member. Since the temperature is higher inside the housing than outside the housing, if the portion inside the housing of the first fastening member and the first protrusion outside the housing are the same in cross-sectional area, the portion inside the housing of the first fastening member is larger in electrical resistance than the first protrusion.

The fuel cell device according to the fourth aspect, however, is configured such that the portion inside the housing of the first fastening member larger in electrical resistance is larger in cross-sectional area than the first protrusion. It is thus possible to adjust a difference in the magnitude of electrical resistance due to a temperature difference and optimize conductivity of the first fastening member. Since the cross-sectional area of the first protrusion can be made small, an opening area of a through-hole formed in the housing so as to protrude the first fastening member from inside the housing to the outside can be made small, and the amount of heat radiation from inside the housing to the outside can be reduced.

The fuel cell device according to a fifth aspect of the present disclosure, in any one of the second to fourth aspects, may further include through-holes which are formed in a wall of the housing to allow the first fastening member and the second fastening member to extend through, respective flanged juts which are provided at the first protrusion and the second protrusion, and first sealing materials having elasticity which are arranged between the juts and the wall of the housing, and the juts may be arranged in close contact with the housing via the first sealing materials so as to close gaps formed between the first and second protrusions and the through-holes.

In the above-described configuration, the respective juts are provided at the first protrusion and the second protrusion, and the first sealing materials are arranged between the juts and the wall of the housing. It is thus possible to prevent an inside of the housing from communicating with the outside via the gaps formed at the through-holes and keep airtightness inside the housing.

The first sealing materials have elasticity. For this reason, even if the positions of the juts are displaced due to compression or expansion of the fuel cell stack in the stacking direction of the unit cells resulting from a temperature change, the first sealing materials can accommodate the displacements by being deformed.

The fuel cell device according to a sixth aspect of the present disclosure, in the fifth aspect, may further include a thermal insulator which covers at least a part of a periphery of the housing.

In the above-described configuration, since the periphery of the housing is covered by the thermal insulator, heat radiation from inside the housing to the outside can be inhibited. If a configuration having the thermal insulator provided between the housing and the first elastic member is adopted, the temperature of a position at which the first elastic member is provided can be set to a temperature lower than that inside the housing. For this reason, an inexpensive stainless compression spring, for example, can be adopted as the first elastic member. The manufacturing cost can be reduced as compared with a case where an expensive heat-resistant ceramic spring is used.

The fuel cell device according to a seventh aspect of the present disclosure, in the sixth aspect, may further include respective insertion holes which are formed in the thermal insulator to allow the first protrusion and the second protrusion to be inserted into, and second sealing materials having elasticity which are arranged between surfaces opposite to surfaces, on which the first sealing materials are provided, of the juts and the insertion holes, and the juts may be arranged in close contact with the thermal insulator via the second sealing materials so as to close gaps formed between the first and second protrusions and the insertion holes.

The above-described configuration further includes the second sealing materials. It is thus possible to prevent the inside of the housing from communicating with the outside via the gaps formed at the through-holes and the insertion holes and keep the airtightness inside the housing. The second sealing materials have elasticity. For this reason, even if the positions of the juts are displaced due to compression or expansion of the fuel cell stack in the stacking direction of the unit cells resulting from a temperature change, the second sealing materials can accommodate the displacements by being deformed together with the first sealing materials.

The fuel cell device according to an eighth aspect of the present disclosure, in any one of the fifth to seventh aspects, may be configured such that a thickness of the juts is smaller than a thickness of the wall of the housing.

Since the thickness of the juts is smaller than that of the wall of the housing, even if the positions of the juts are displaced due to expansion or contraction of the fuel cell stack, the juts can be deformed ahead of the wall of the housing. It is thus possible to maintain sealability for the housing while accommodating the displacements.

First Embodiment

Figure 2:
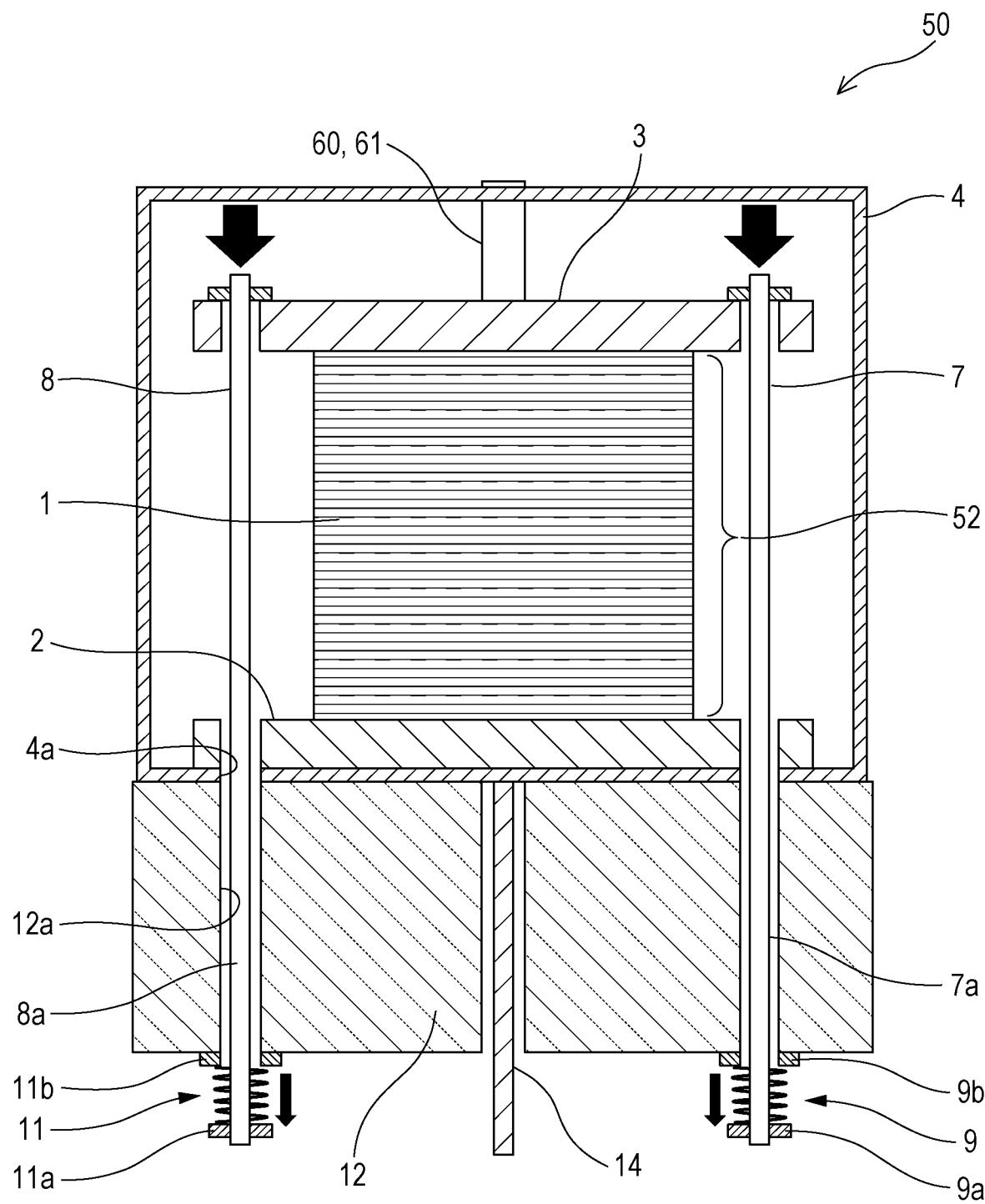
FIG. 2 is a cross-sectional view schematically showing a cross-section taken along line A-A of the fuel cell device shown in FIG. 1.

A fuel cell device 50 according to a first embodiment of the present disclosure will be described with reference to FIGS. 1 and 2. FIG. 1 is a perspective view showing the fuel cell device 50 according to the first embodiment of the present disclosure. FIG. 2 is a cross-sectional view schematically showing a cross-section taken along line A-A of the fuel cell device 50 shown in FIG. 1. Note that, in FIG. 1, a housing 4 of the fuel cell device 50 is indicated by long dashed double-short dashed lines for the purpose of illustration and is shown so as to clarify an internal configuration of the housing 4. A thermal insulator 12 which is provided around a periphery of the fuel cell device 50 is indicated by long dashed short dashed lines and is shown so as to facilitate understanding of the configuration of the fuel cell device 50. Note that a width direction of the fuel cell device 50 is set as an x-axis in FIG. 1, a depth direction is set as a y-axis, and a height direction (perpendicular direction) is set as a z-axis.

As shown in FIGS. 1 and 2, the fuel cell device 50 according to the first embodiment is configured to include a fuel cell stack 52, a first current collector 2, a second current collector 3, a first fastening member 7, a second fastening member 8, a first elastic member 9, a second elastic member 11, and the housing 4. The fuel cell device 50 can be incorporated in, for example, a hot box of a fuel cell system. Note that at least a part of a periphery of the housing 4 may be covered by the thermal insulator 12. Note that, if the housing 4 alone has sufficient thermal insulation performance, the thermal insulator 12 need not be provided around the periphery of the housing 4. The example in FIGS. 1 and 2 illustrates, as an example, a configuration in which the thermal insulator 12 is provided at a peripheral portion corresponding to a bottom of the housing 4.

A so-called high-temperature operation type fuel cell high in operating temperature, such as a solid oxide fuel cell (SOFC) or a molten carbonate fuel cell (MCFC), can be cited as an example of the fuel cell device 50. One corresponding to the type of a fuel cell adopted as the fuel cell device 50 is used as the fuel cell stack 52. Note that the fuel cell device 50 will be described below, taking an SOFC as an example.

Sections constituting the fuel cell device 50 will be described first. A unit cell 1 is a single cell including an electrode catalyst and an electrolyte composed of a solid oxide. For example, the unit cell 1 has a configuration in which a cathode electrode and an anode electrode are provided on two surfaces of the electrolyte (an electrolyte plate) composed of an oxide ion conductor, such as fully stabilized zirconia. An electrochemical reaction in the unit cell 1 resulting from supply of fuel gas containing hydrogen, carbon monoxide, and the like to the anode electrode side and oxidant gas containing air and the like to the cathode electrode side generates an electromotive force. Note that a flat plate shape can be adopted as the shape of the unit cell 1 that the fuel cell device 50 includes, as shown in FIG. 1 or 2.

The fuel cell stack 52 is formed by stacking a plurality of unit cells 1. Although the fuel cell device 50 is configured such that a stacking direction of the unit cells in the fuel cell stack 52 coincides with a direction of the z-axis, the present disclosure is not limited to this.

The first current collector 2 and the second current collector 3 are arranged such that the fuel cell stack 52 is sandwiched between the first current collector 2 and the second current collector 3 in the stacking direction of the unit cells 1. That is, the first current collector 2 and the second current collector 3 are arranged at an end on one side of the fuel cell stack 52 in the stacking direction of the unit cells 1 (an end on a lower side of the fuel cell stack 52 in FIG. 1) and at an end on the other side (an end on an upper side of the fuel cell stack 52 in FIG. 1), respectively, such that the fuel cell stack 52 is sandwiched.

The fuel cell stack 52, the first current collector 2, and the second current collector 3 described above are stored in the housing 4. At least a part of the periphery of the housing 4 may be covered by the thermal insulator 12. Although the thermal insulator 12 is provided around a portion on the bottom side of the housing 4 of the periphery in the fuel cell device 50, as shown in FIGS. 1 and 2, the present disclosure is not limited to this configuration. For example, the thermal insulator 12 may cover the entire periphery of the housing 4 or may cover the bottom and four side surfaces of the housing 4. A heat-resistant, thermal insulating material in the form of a molded block and having a microporous structure may be adopted as the thermal insulator 12.

In the fuel cell device 50, the oxidant gas is supplied from a lower surface of the fuel cell stack 52 (not shown) and is discharged through a slit 53 formed between the adjacent unit cells 1 at the fuel cell stack 52, as shown in FIG. 1. Meanwhile, the fuel gas is supplied through a fuel gas inlet 60 at an upper surface of the fuel cell stack 52, circulates through the fuel cell stack 52, and is discharged as anode off-gas through a fuel gas outlet 61 formed at the upper surface. The fuel gas supplied to the fuel cell stack 52 can be produced, for example, from source gas, such as city gas or LPG, and water through steam reforming in a reformer (not shown).

The fuel gas (anode off-gas) not used for power generation may be mixed with air (cathode off-gas) discharged through the slits 53 in side surfaces of the fuel cell stack 52 and be burned inside the hot box (not shown), and heat of the burned gas may be used for, for example, heating of the fuel cell device 50, reforming reaction, water vaporization, or prewarming of air and source gas to be supplied.

The fuel cell device 50 is also configured such that an electromotive force generated in the fuel cell stack 52 can be extracted as power to the outside via the first current collector 2 and the second current collector 3.

The first fastening member 7 is a conductive member which is electrically connected to the second current collector 3 and extends from the second current collector 3 toward the side where the first current collector 2 is disposed along the stacking direction of the unit cells 1. The first fastening member 7 is electrically connected to the second current collector 3, as described above, and power from the second current collector 3 can be extracted at a distal end of a first protrusion 7a. More specifically, a power extractor 14 is electrically connected to the first current collector 2, as shown in FIGS. 1 and 2. In the fuel cell device 50, power produced through power generation in the fuel cell stack 52 can be obtained from the first fastening member 7 and the power extractor 14.

Note that the first fastening member 7 is electrically connected to the second current collector 3 and may be composed of, for example, ZMG® 232G10 that is a ferritic stainless material as a conductive material which can be used at a high temperature of 600° C. or more. ZMG® 232G10 that is a ferritic stainless material has thermal expansibility close to that of zirconic ceramic that is a chief material for the fuel cell stack 52 and high oxidation resistance and is suitable as the material for the first fastening member 7.

The first elastic member 9 is provided at the first protrusion 7a of the first fastening member 7. The first elastic member 9 elastically biases the second current collector 3 toward the first current collector 2 via the first fastening member 7. Specifically, for example, a lower presser 9a which juts like a flange is formed at the first protrusion 7a of the first fastening member 7. An upper presser 9b, which is arranged above the lower presser 9a, that is, on the housing 4 side and in which the first protrusion 7a of the first fastening member 7 is slidably inserted, is also provided. The first elastic member 9 that expands and contracts in a direction coincident with the stacking direction of the unit cells 1 is provided between the lower presser 9a and the upper presser 9b at the first protrusion 7a while being compressively deformed. As shown in FIG. 1, the lower presser 9a and the upper presser 9b may be both circular flat plates having centers, through which the first fastening member 7 extends, and having planes vertical to the stacking direction of the unit cells 1. A position at which the lower presser 9a is provided may be in the vicinity of a distal end of the first fastening member 7.

Note that the upper presser 9b and the lower presser 9a are fixed to predetermined locations inside the fuel cell device 50 or predetermined locations of an installation space of the fuel cell device 50 under biasing force from the first elastic member 9. For example, the upper presser 9b may be provided so as to be in contact with a bottom of the thermal insulator 12, as shown in FIG. 2, and be fixed to the bottom of the thermal insulator 12 under a biasing force from the first elastic member 9. Meanwhile, the lower presser 9a may be fixed to, for example, a floor surface on which the fuel cell device 50 is installed or a mount on which the fuel cell device 50 is placed under a biasing force from the first elastic member 9. In the fuel cell device 50, the lower presser 9a is pressed in a direction from the second current collector 3 toward the first current collector 2 (a downward direction in FIG. 2) along the stacking direction of the unit cells 1 by a restoring force of the compressively deformed first elastic member 9. Along with the press, the first fastening member 7 comes to be pulled in the direction from the second current collector 3 toward the first current collector 2 along the stacking direction of the unit cells 1, as shown in FIG. 2. This allows application of a load of predetermined magnitude to the fuel cell stack 52 in the direction from the second current collector 3 to the first current collector 2. Even if the fuel cell device 50 repeats temperature changes between a room-temperature state and a high-temperature state, for example, the first elastic member 9 accommodates a difference in the amount of displacement due to expansion and contraction in the stacking direction of the unit cells 1 of the fuel cell stack 52 or the like, and the load of the predetermined magnitude can be continuously applied in the stacking direction of the unit cells 1. Thus, in the fuel cell device 50, the first fastening member 7 can exert a force such that a load of the predetermined magnitude is applied to the entire the fuel cell stack 52.

As described above, the first fastening member 7 can function as a fastening member for fastening the unit cells 1 constituting the fuel cell stack 52 and function as a power extractor which extracts power from the fuel cell stack 52. Note that a rod-shaped conductive member can be adopted as the first fastening member 7, as shown in FIGS. 1 and 2. Since the thermal insulator 12 is provided between the housing 4 and the first elastic member 9, as shown in FIGS. 1 and 2, heat radiation from inside the housing 4 to the outside can be inhibited. If the configuration having the thermal insulator 12 provided between the housing 4 and the first elastic member 9 is adopted, the temperature of a position at which the first elastic member 9 is provided can be set to a temperature lower than that inside the housing 4. For example, even if the temperature inside the housing 4 is not less than 600° C., the temperature of the position, at which the first elastic member 9 is provided, can be made not more than 300° C. For this reason, an inexpensive stainless compression spring (for example, a compression spring of SUS304) can be adopted as the first elastic member 9. The manufacturing cost can be thus reduced as compared with a case where an expensive heat-resistant ceramic spring is used.

The configuration is such that a force is exerted from the first elastic member 9 on the thermal insulator 12 via the upper presser 9b. Since the thermal insulator 12 can be constructed using, for example, a heat-resistant, thermal insulating material in the form of a molded block and having a microporous structure, the thermal insulator 12 can have sufficient yield strength to deal with even a case where a load is applied under a high-temperature environment.

Note that, if a sufficient load cannot be applied to the fuel cell stack 52 only by the first fastening member 7 or if a uniform load cannot be applied to the entire fuel cell stack 52, the fuel cell device 50 may include the second fastening member 8 and the second elastic member 11, as shown in FIGS. 1 and 2.

The second fastening member 8 is a member which extends from the second current collector 3 toward the side where the first current collector 2 is disposed in parallel with the first fastening member 7. The second fastening member 8 has a second protrusion 8a which protrudes from inside the housing 4 to outside the housing 4. The second elastic member 11 is provided at the second protrusion 8a of the second fastening member 8.

The second elastic member 11 elastically biases the second current collector 3 toward the first current collector 2 via the second fastening member 8. Specifically, an expansion and contraction direction of the second elastic member 11 coincides with the stacking direction of the unit cells 1, like the first elastic member 9. The second elastic member 11 is provided, for example, between a lower presser 11a which juts like a flange and an upper presser 11b, which is arranged above the lower presser 11a, that is, on the housing 4 side and in which the second fastening member 8 is slidably inserted, at the second protrusion 8a while being compressively deformed. The configuration of the second elastic member 11 is the same as that of the first elastic member 9, and a description thereof will be omitted.

Note that, if the fuel cell stack 52 is composed of, for example, rectangular flat-plate cells, the first fastening member 7 may be arranged so as to be inserted in the rectangular second current collector 3 at one of four corners, and a plurality of second fastening members 8 are arranged so as to be inserted at the remaining three corners, respectively, as shown in FIG. 1. Alternatively, two or more first fastening members 7 may be provided and be arranged so as to be inserted in the second current collector 3 at two or more corners. Additionally, four first fastening members 7 may be arranged so as to be inserted in the second current collector 3 at all the four corners, respectively. With the above-described configuration, in which at least one of the first fastening member 7 and the second fastening member 8 is inserted in the second current collector 3 at each of the four corners, a force exerted from the first elastic member(s) 9 and/or the second elastic member(s) 11 can be equally applied to the entire second current collector 3. This allows the fuel cell device 50 to apply an even compressive load to the fuel cell stack 52. In the case of a configuration in which a plurality of first fastening members 7 are inserted in the second current collector 3, the total of the cross-sectional areas of the plurality of first fastening members 7 can be considered as the cross-sectional area of the first fastening members 7. The adoption of the configuration, in which the plurality of first fastening members 7 are inserted in the second current collector 3, allows an increase in the cross-sectional area of the first fastening members 7. This results in a reduction in electrical resistance and a reduction in power loss.

Thus, the fuel cell device 50 can satisfactorily maintain gas sealability between the unit cells constituting the fuel cell stack 52 and current collectability and curb a reduction in power generation performance.

Note that, for example, one pair of fixing members which is made of H-steel and is arranged in the form of rails may be used as a mount for the fuel cell device 50 at the time of incorporating the fuel cell device 50 into the hot box of the fuel cell system. In this case, a space for the work of installing the fuel cell device 50 can be formed between the one pair of fixing members, and the first elastic member 9 and the second elastic member 11 described above can be stored in the space. The fuel cell device 50 can have a compact configuration as compared with a configuration in which a region for storing the first elastic member 9 and the second elastic member 11 is separately provided.

Figure 3:
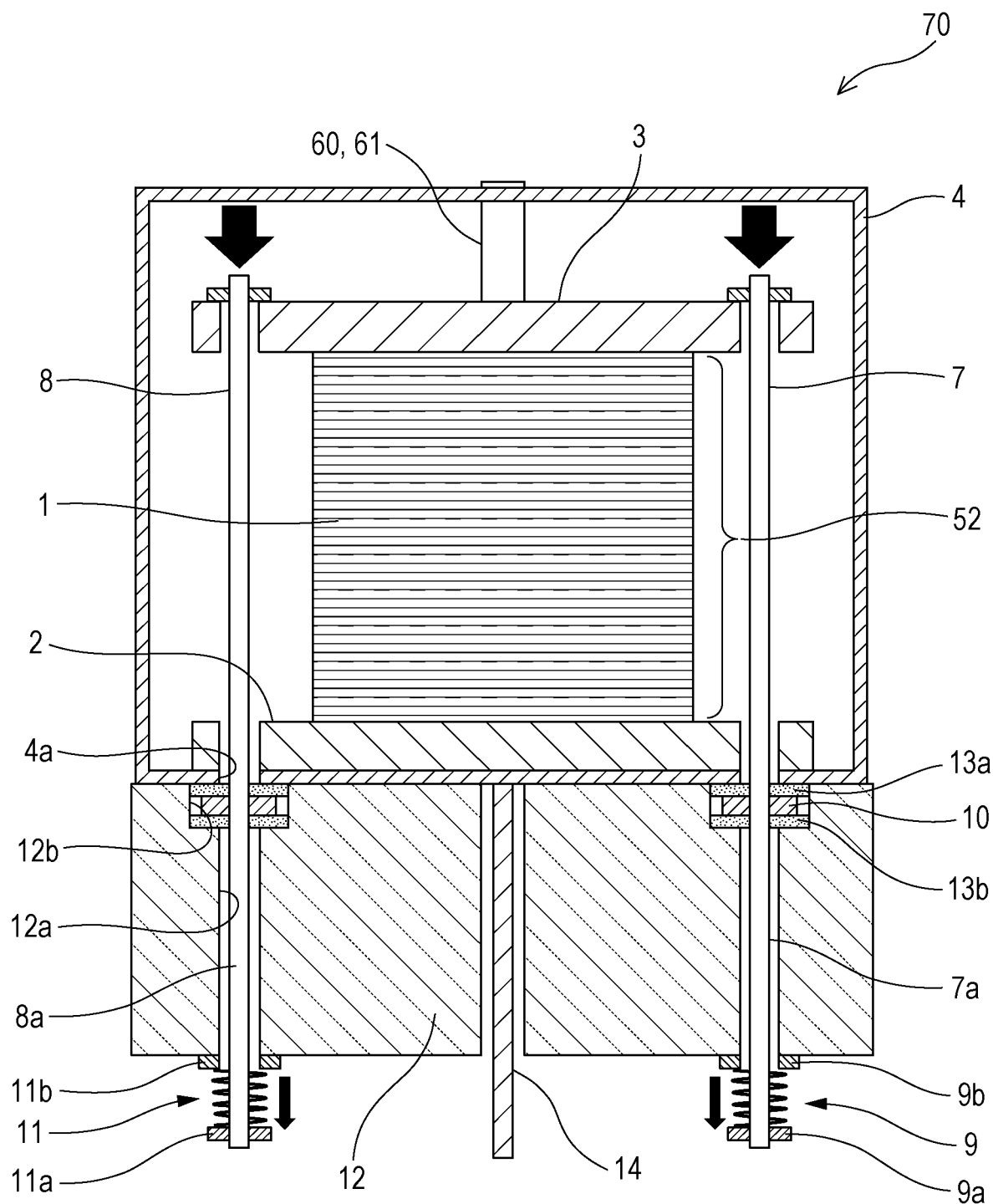
FIG. 3 is a cross-sectional view schematically showing the configuration of a fuel cell device according to a second embodiment of the present disclosure.

As shown in FIG. 2, a through-hole 4a is formed in a wall of the housing 4 (the bottom of the housing 4 in FIGS. 1 and 2) such that the first fastening member 7 is made to extend through the housing 4 and protrude to outside the housing 4. For this reason, air inside the housing 4 may leak or heat inside the housing 4 may be radiated to the outside through gaps formed between the through-holes 4a and the first and second fastening members 7 and 8. To keep airtightness inside the housing 4, a flanged jut 10 may be provided at a position corresponding to the through-hole 4a of each of the first protrusion 7a of the first fastening member 7 and the second protrusion 8a of the second fastening member 8. A configuration in which the first fastening member 7 and the second fastening member 8 each include the jut 10 will be described as a second embodiment below with reference to FIG. 3. FIG. 3 is a cross-sectional view schematically showing the configuration of a fuel cell device 70 according to the second embodiment of the present disclosure. FIG. 3 represents a cross-section taken along line A-A in FIG. 1, as in FIG. 2.

Second Embodiment

As shown in FIG. 3, the fuel cell device 70 according to the second embodiment is different in that the fuel cell device 70 is obtained by configuring the fuel cell device 50 according to the first embodiment such that the first protrusion 7a of the first fastening member 7 and the second protrusion 8a of the second fastening member 8 each further include a jut 10. Since the fuel cell device 70 according to the second embodiment is the same as the fuel cell device 50 according to the first embodiment in other components, same members are denoted by same reference characters, and a description thereof will be omitted.

As shown in FIG. 3, through-holes 4a are formed in a wall (bottom) of a housing 4 in the fuel cell device 70 such that a first fastening member 7 and a second fastening member 8 each extend through and protrude from inside the housing 4. In the fuel cell device 70, the flanged jut 10 is provided at each of a first protrusion 7a and a second protrusion 8a. As shown in FIG. 3, the jut 10 can be formed into a circular flat plate jutting from the first fastening member 7 or the second fastening member 8 in a direction parallel to the wall (bottom) of the housing 4. A first sealing material 13a having elasticity is arranged between the jut 10 and the wall (bottom) of the housing 4, and the jut 10 is arranged so as to be in close contact with the housing 4 via the first sealing material 13a such that a gap formed between each of the first and second fastening members 7 and 8 and the through-hole 4a is closed. For this reason, the fuel cell device 70 can keep airtightness inside the housing 4.

In the case of a configuration in which a thermal insulator 12 is provided around a periphery of the housing 4 and the first fastening member 7 and the second fastening member 8 are inserted in the thermal insulator 12, the fuel cell device 70 may be configured in the manner below. That is, if the fuel cell device 70 includes the thermal insulator 12 on a bottom side of the housing 4, respective insertion holes 12a, in which the first protrusion 7a and the second protrusion 8a are inserted, and storages 12b, which communicate with the insertion holes 12a and in which the juts 10 are stored, are formed inside the thermal insulator 12. As described above, the first sealing material 13a is arranged between the wall of the housing 4 and the jut 10 in the storage 12b. A second sealing material 13b having elasticity is arranged between a surface opposite to a surface, on which the first sealing material 13a is provided, of the jut 10 and the insertion hole 12a. The jut 10 is arranged so as to be in close contact with the housing 4 via the first sealing material 13a such that the gap formed between each of the first and second fastening members 7 and 8 and the through-hole 4a is closed. The jut 10 may be arranged so as to be in close contact with the thermal insulator 12 via the second sealing material 13b such that a gap formed between each of the first and second fastening members 7 and 8 and the insertion hole 12a is closed. If the fuel cell device 70 is configured in the above-described manner, the fuel cell device 70 can prevent an inside of the housing 4 from communicating with the outside via the gaps at the through-holes 4a and the gaps at the insertion holes 12a and keep the airtightness inside the housing 4.

Figure 4A:
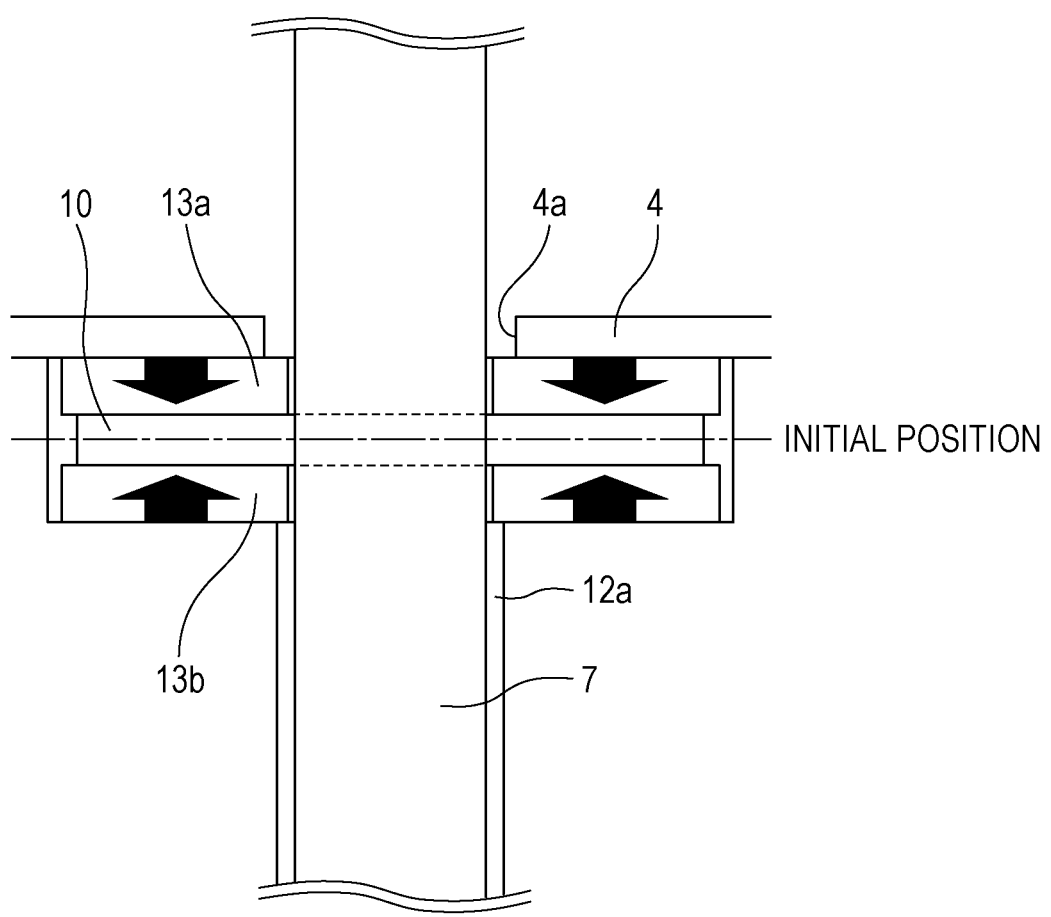
FIG. 4A is a cross-sectional view schematically showing a positional relationship among a bottom of a housing, a jut, and a first sealing material and a second sealing material provided on the jut in the fuel cell device shown in FIG. 3.
Figure 4B:
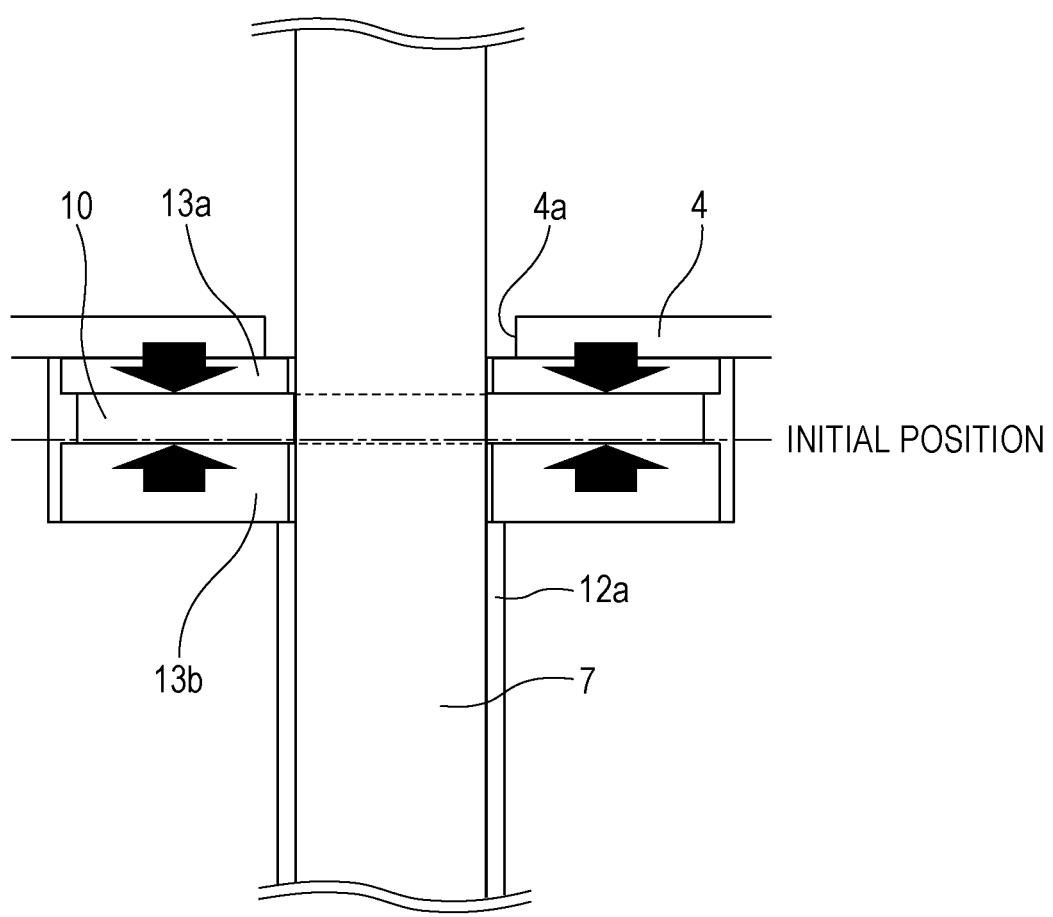
FIG. 4B is a cross-sectional view schematically showing a positional relationship among the bottom of the housing, the jut, and the first sealing material and the second sealing material provided on the jut in the fuel cell device shown in FIG. 3.

The first sealing material 13a and the second sealing material 13b have elasticity. For this reason, even if a fuel cell stack 52 expands or contracts due to a temperature change, and the distance between the bottom of the housing 4 and the jut 10 becomes shorter or longer than that when the jut 10 is at an initial position, as shown in FIGS. 4A to 4C, the first sealing material 13a and the second sealing material 13b can accommodate a displacement of the jut 10 by being deformed. FIGS. 4A to 4C are cross-sectional views schematically showing positional relationships among the bottom of the housing 4, the jut 10, and the first sealing material 13a and the second sealing material 13b provided on the jut 10 in the fuel cell device 70 shown in FIG. 3.

FIG. 4A shows a state in which the bottom of the housing 4, the jut 10, the first sealing material 13a, and the second sealing material 13b are at respective initial positions, for example, before operation of the fuel cell device 70. FIG. 4B shows a state in which the fuel cell stack 52 exposed to a high temperature expands in a stacking direction of unit cells 1 (a vertical direction), the first fastening member 7 is pulled to the housing 4 side in association with the expansion, and the jut 10 is located above the initial position. FIG. 4C shows a state in which the fuel cell stack 52 contracts in the stacking direction of the unit cells 1 due to, for example, a temperature change from the high temperature to a room temperature, the first fastening member 7 moves in a downward direction away from the housing 4 in association with the contraction, and the jut 10 is located below the initial position. Note that long dashed short dashed lines in FIGS. 4A to 4C indicate the position of the jut 10 when the jut 10 is at the initial position.

For example, a case is conceivable where the fuel cell stack 52 expands in the stacking direction of the unit cells 1 in response to a temperature change, the jut 10 is thereby located above the initial position, and the distance between the housing 4 and the jut 10 becomes shorter, as shown in FIG. 4B. In this case, the first sealing material 13a can be deformed so as to be compressed, and the second sealing material 13b can be deformed to be expanded, in the stacking direction of the unit cells 1.

A case is also conceivable where the fuel cell stack 52 contracts in the stacking direction of the unit cells 1 in response to a temperature change, the jut 10 is thereby located below the initial position, and the distance between the housing 4 and the jut 10 becomes longer, as shown in FIG. 4C. In this case, the first sealing material 13a can be deformed so as to be expanded, and the second sealing material 13b can be deformed so as to be compressed, in the stacking direction of the unit cells 1. For this reason, in the fuel cell device 70, the first sealing material 13a and the second sealing material 13b can accommodate a change in shape (a displacement in the stacking direction of the unit cells 1) of the fuel cell stack 52 of the fuel cell device 70 due to a temperature change to maintain a fixed load on the fuel cell stack 52.

Thus, the fuel cell device 70 can satisfactorily maintain gas sealability between the unit cells 1 and current collectability and curb a reduction in power generation performance. Additionally, the fuel cell device 70 can keep the airtightness inside the housing 4 and can reduce radiation loss.

Figure 5A:
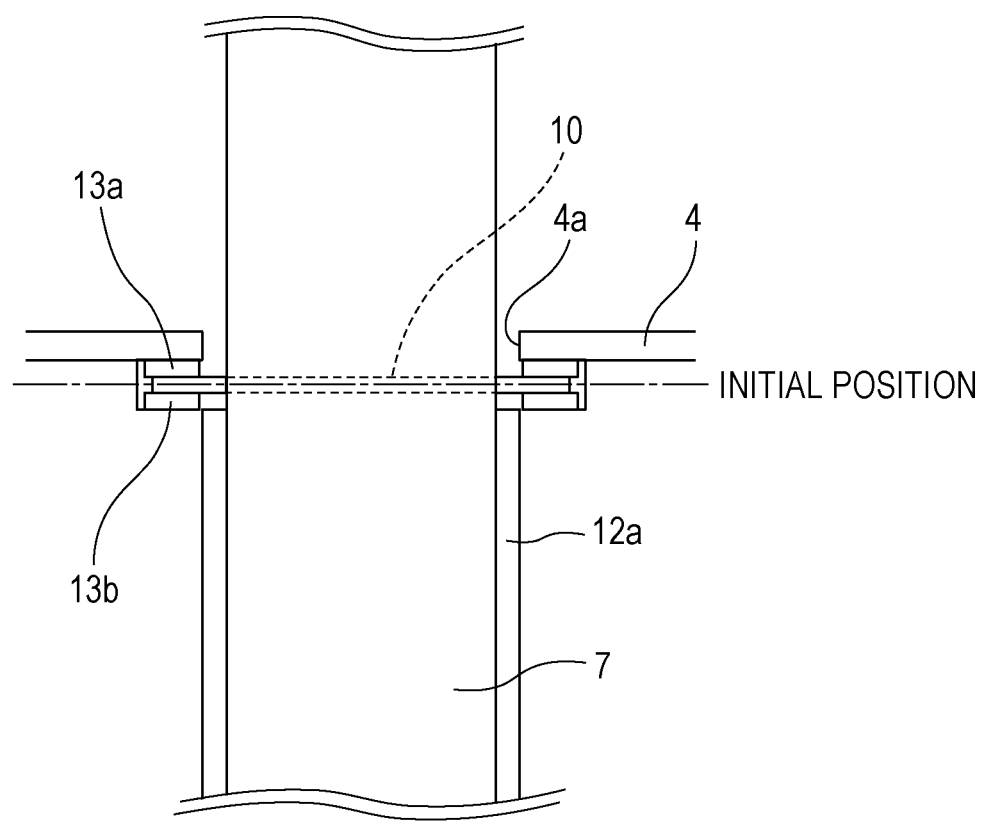
FIG. 5A is a view showing a modification of the fuel cell device shown in FIG. 3 and is a cross-sectional view schematically showing a positional relationship among a bottom of the housing, the jut, and the first sealing material and the second sealing material provided on the jut.
Figure 5C:
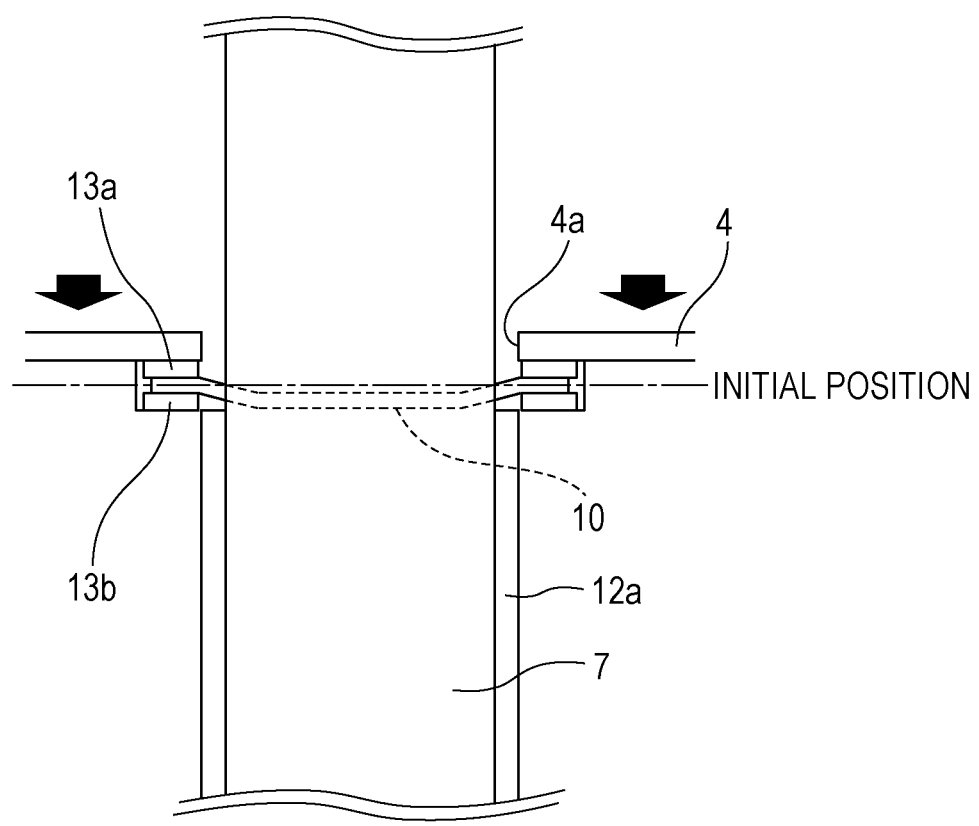
FIG. 5C is a view showing the modification of the fuel cell device shown in FIG. 3 and is a cross-sectional view schematically showing a positional relationship among the bottom of the housing, the jut, and the first sealing material and the second sealing material provided on the jut.

As shown in FIGS. 5A to 5C, the fuel cell device 70 according to the second embodiment may be configured such that the thickness of the flanged jut 10 is smaller than that of the bottom of the housing 4. FIGS. 5A to 5C are views showing a modification of the fuel cell device 70 shown in FIG. 3 and are cross-sectional views schematically showing positional relationships among a bottom of the housing 4, the jut 10, and the first sealing material 13a and the second sealing material 13b provided on the jut 10. FIG. 5A shows a state in which the bottom of the housing 4, the jut 10, the first sealing material 13a, and the second sealing material 13b are at respective initial positions, for example, before operation of the fuel cell device 70. FIG. 5B shows a state in which the fuel cell stack 52 exposed to a high temperature expands in a stacking direction of the unit cells 1 (a vertical direction), the first fastening member 7 is pulled to the housing 4 side in association with the expansion, and the jut 10 is located above the initial position. FIG. 5C shows a state in which the fuel cell stack 52 contracts in the stacking direction of the unit cells 1 due to, for example, a temperature change from the high temperature to a room temperature, the first fastening member 7 moves in a downward direction away from the housing 4 in association with the contraction, and the jut 10 is located below the initial position. Long dashed short dashed lines in FIGS. 5A to 5C indicate the position of the jut 10 when the jut 10 is at the initial position.

Note that, in each of the cross-sectional views in FIGS. 5A to 5C, the shape of the jut 10 is indicated by broken lines to facilitate understanding of the entire shape of the jut 10 after deformation. In the example shown in FIGS. 5A to 5C, the first sealing material 13a and the second sealing material 13b are shown as not having elasticity. However, the first sealing material 13a and the second sealing material 13b may each have elasticity and change in shape so as to be compressed or expanded in response to a displacement in the vertical direction of the first fastening member 7, as shown in FIGS. 4A to 4C.

In the fuel cell device 70, the thickness of the jut 10 may be, for example, 0.3 to 0.6 mm when the thickness of the bottom of the housing 4 is, for example, 2.0 mm. With this configuration, even if the fuel cell stack 52 is displaced in the stacking direction of the unit cells 1 (the vertical direction) in response to a temperature change, as shown in FIG. 5B or 5C, and the first fastening member 7 is also displaced in the vertical direction in association with the displacement, the jut 10 can be deformed in accordance with the displacement in the vertical direction of the first fastening member 7. That is, when the first fastening member 7 is displaced in the vertical direction, the jut 10 can accommodate the displacement if the thickness of the jut 10 is smaller than that of the housing 4. If the jut 10 is thicker than the housing 4, the first fastening member 7 and the housing 4 are displaced together, a load on the fuel cell stack 52 changes, and gas sealability and current collectability deteriorate. More specifically, the jut 10 smaller in thickness than the housing 4 can be deformed ahead of the housing 4. For example, a case is conceivable where the fuel cell stack 52 expands in the stacking direction of the unit cells 1 (the vertical direction) in response to a temperature change to locate the jut 10 above the initial position, as shown in FIG. 5B. In this case, since the thickness of the jut 10 is small (for example, the thickness of the jut 10 is 0.3 to 0.6 mm for the thickness of 2.0 mm of the housing 4), the jut 10 can be deformed such that a proximal end side protrudes upward above a distal end side.

For example, a case is also conceivable where the fuel cell stack 52 contracts in the stacking direction of the unit cells 1 (the vertical direction) in response to a temperature change to locate the jut 10 below the initial position, as shown in FIG. 5C. In this case, since the thickness of the jut 10 is small (for example, the thickness of the jut 10 is 0.3 to 0.6 mm for the thickness of 2.0 mm of the housing 4), the jut 10 can be deformed such that the proximal end side of the jut 10 protrudes downward below the distal end side.

If the fuel cell device 70 is configured such that the thickness of the jut 10 is smaller than that of the bottom of the housing 4, as described above, the jut 10 changes in shape ahead of the housing 4 and can accommodate a displacement in the vertical direction of the first fastening member 7 while maintaining sealability for the through-hole 4a of the housing 4.

Third Embodiment

Figure 6:
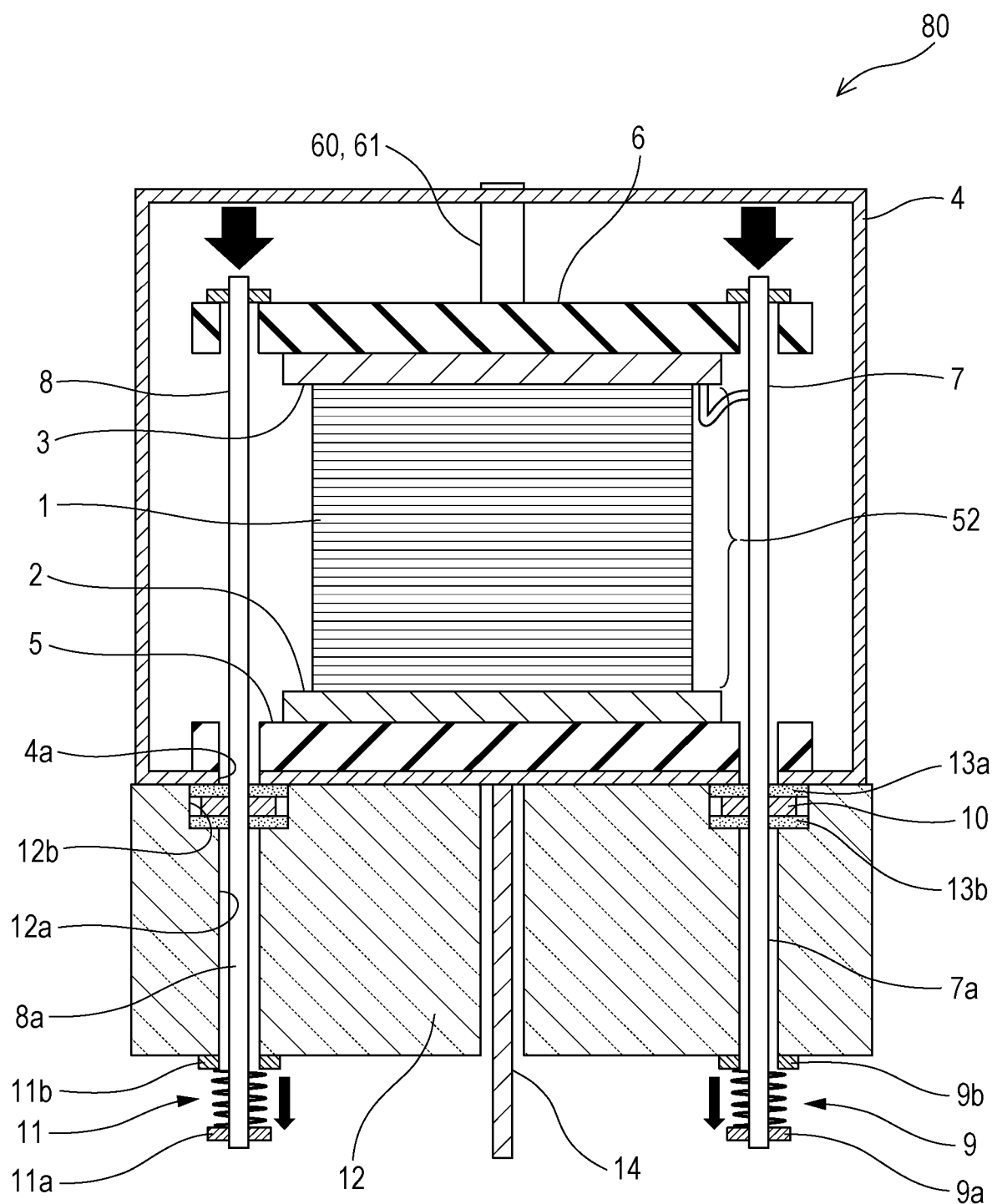
FIG. 6 is a cross-sectional view showing an example of the configuration of a fuel cell device according to a third embodiment of the present disclosure.

The configuration of a fuel cell device 80 according to a third embodiment will be described with reference to FIG. 6. FIG. 6 is a cross-sectional view showing an example of the configuration of the fuel cell device 80 according to the third embodiment of the present disclosure. The fuel cell device 80 according to the third embodiment is obtained by configuring the fuel cell device 50 according to the first embodiment or the fuel cell device 70 according to the second embodiment to further include a first end member 5 and a second end member 6 and is the same in the other respects as the fuel cell device 50 according to the first embodiment or the fuel cell device 70 according to the second embodiment. Same members are denoted by same reference characters, and a description thereof will be omitted. Note that a configuration obtained by configuring the fuel cell device 70 according to the second embodiment to further include the first end member 5 and the second end member 6 will be described as an example with reference to FIG. 6.

As shown in FIG. 6, in the fuel cell device 80 according to the third embodiment, a first current collector 2 is arranged at one end of a fuel cell stack 52 in a stacking direction of unit cells 1, a second current collector 3 is arranged at the other end, and the fuel cell stack 52 is sandwiched between the first current collector 2 and the second current collector 3. In FIG. 6, the first current collector 2 is arranged at an end on a lower side of the fuel cell stack 52, and the second current collector 3 is arranged at an end on an upper side of the fuel cell stack 52. The first end member 5 is arranged on an outer side (a side opposite to a side in contact with the fuel cell stack 52) of the first current collector 2, and the second end member 6 is arranged on an outer side (a side opposite to a side in contact with the fuel cell stack 52) of the second current collector 3. That is, in the fuel cell device 80, the first end member 5 is arranged on a bottom of a housing 4, the first current collector 2 is arranged on the first end member 5, the fuel cell stack 52 is arranged on the first current collector 2, the second current collector 3 is arranged on the fuel cell stack 52, and the second end member 6 is arranged on the second current collector 3, in this order. A first fastening member 7 and/or a second fastening member 8 is fixed to the second end member 6, is extended from the second end member 6 toward the first end member 5 along the stacking direction of the unit cells 1, and is arranged so as to protrude from the housing 4. The configuration is such that force is exerted from a first elastic member 9 and/or a second elastic member 11 via the first fastening member 7 and/or the second fastening member 8 so as to press the second end member 6 toward the first end member 5.

The first end member 5 and the second end member 6 are composed of, for example, an insulating material, such as a mica insulating sheet. For this reason, the fuel cell device 80 can electrically insulate the fuel cell stack 52, the first current collector 2, and the second current collector 3 from the housing 4, using the first end member 5 and the second end member 6. Additionally, since the fuel cell device 80 insulates an upper surface side of the fuel cell stack 52 with the second end member 6, if a different member is provided above the housing 4, there is no need to take into consideration, for example, a distance for insulation from the fuel cell stack 52 and the like and selection of the material for the different member, and a simpler inexpensive configuration can be adopted.

Fourth Embodiment

Figure 7:
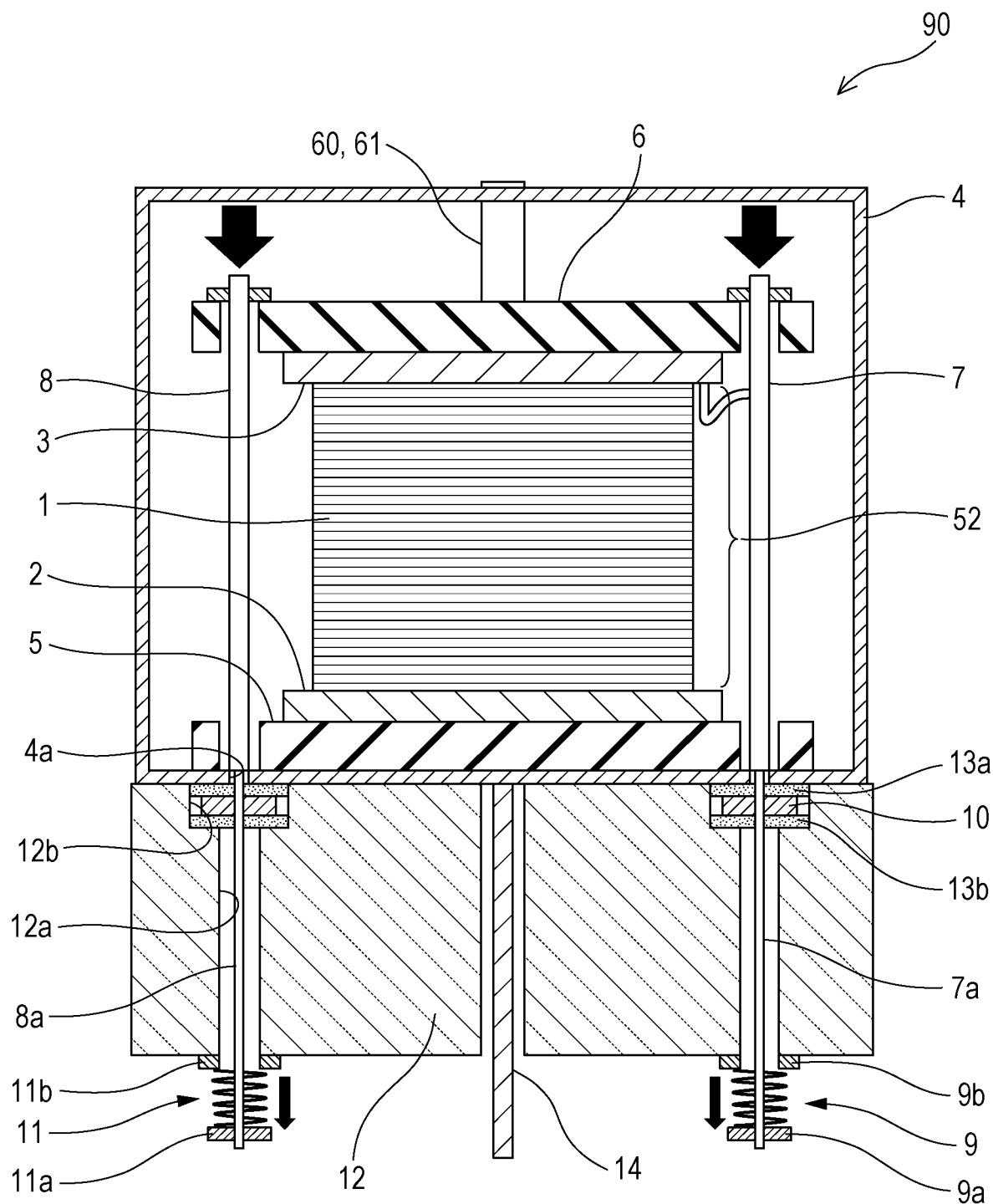
FIG. 7 is a cross-sectional view showing an example of the configuration of a fuel cell device according to a fourth embodiment of the present disclosure.
Figure 8:
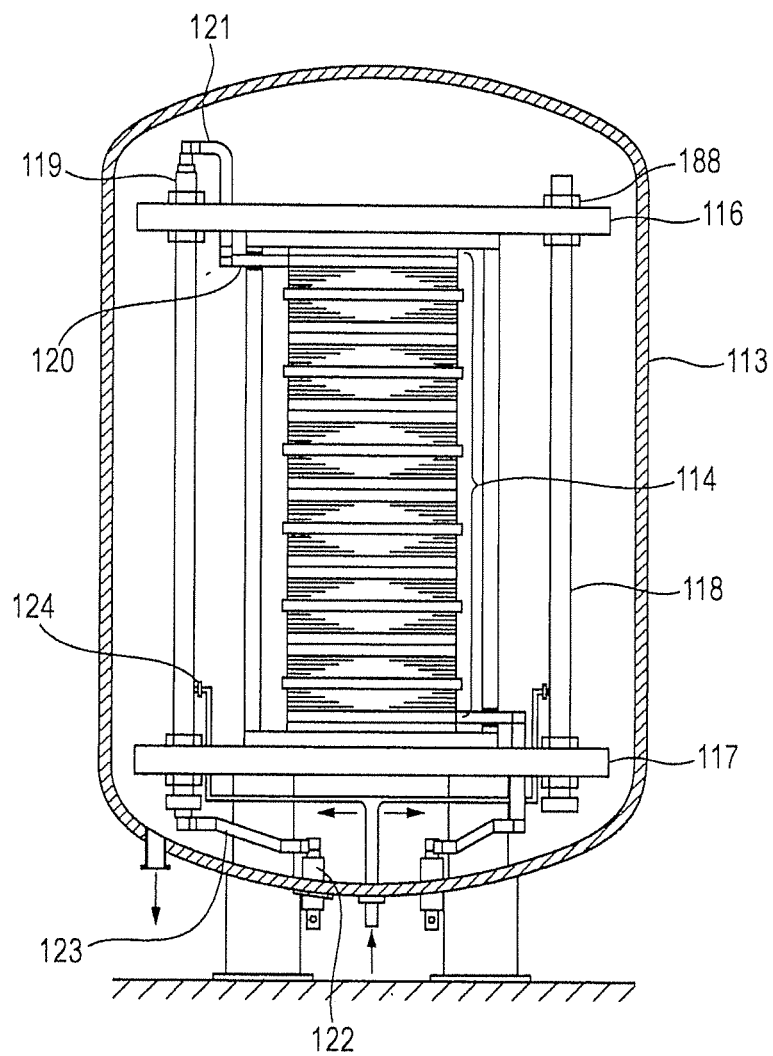
FIG. 8 is a cross-sectional view showing the configuration of a fuel cell device according to the related art.

A fuel cell device 90 according to a fourth embodiment of the present disclosure may be obtained by configuring any of the fuel cell devices 50, 70, and 80 according to the first to third embodiments such that the cross-sectional area of a first protrusion 7a in a first fastening member 7 is smaller than that of the remaining portion stored in a housing 4, as shown in FIG. 7. Other components are the same as those of the fuel cell devices 50, 70, and 80 according to the first to third embodiments, and a description other than a description of the first fastening member 7 will be omitted. FIG. 7 is a cross-sectional view showing an example of the configuration of the fuel cell device 90 according to the fourth embodiment of the present disclosure. Note that FIG. 7 illustrates, as an example, a configuration obtained by configuring the fuel cell device 80 according to the third embodiment such that the cross-sectional area of the first protrusion 7a in the first fastening member 7 is smaller than that of the remaining portion. Although the cross-sectional area of a second protrusion 8a in a second fastening member 8 is also smaller than that of the remaining portion in FIG. 7, like the first fastening member 7, the present disclosure is not limited to this. In the second fastening member 8, a portion stored in the housing 4 may be the same in cross-sectional area as the second protrusion 8a.

An electromotive force from a fuel cell stack 52 is generally several tens to a hundred and several tens V. Since the power generation performance of a household fuel cell device is, for example, about 700 W, the value of a current obtained through power generation by the fuel cell device 90 can be set to, for example, 10 to 30 A. When such a large current is fed, power loss may be generated if the conductivity of the first fastening member 7 is low. Electrical resistance when a current flows through a conductive member, such as the first fastening member 7, can be generally given by Expression (1) below.

$$\rho(\text{resistance}) = \alpha \cdot L(\text{length})/S(\text{cross-sectional area}) \cdot f(T(\text{temperature})) \quad (1)$$

As can be seen from Expression (1), a conductive material, of which the first fastening member 7 is composed, increases in electrical resistance with a rise in temperature. For this reason, in the fuel cell device 90 operating at a high temperature, generation of a power loss of about several % in the first fastening member 7 is not negligible.

For this reason, in the fuel cell device 90 according to the fourth embodiment, a portion which is exposed to a high temperature to increase in electrical resistance in the first fastening member 7, that is, a portion stored in the housing 4 is configured so as to have a maximum cross-sectional area. In the first protrusion 7a not exposed to a high temperature, the cross-sectional area is minimized so as to reduce the amount of heat radiation from inside the housing 4 to the outside by minimizing a through-hole 4a formed in a bottom of the housing 4. For example, a cross-section of a portion stored in the housing 4 of the first fastening member 7 can be given the shape of a circle having a diameter of about 8.0 mm, and a cross-section of the first protrusion 7a can be given the shape of a circle having a diameter of about 4.0 mm.

In the fuel cell device 90 according to the fourth embodiment, it is possible to adjust a difference in the magnitude of electrical resistance due to a temperature difference and optimize the conductivity of the first fastening member 7 by adopting different cross-sectional areas for a portion as the first protrusion 7a and the remaining portion in the first fastening member 7, as described above. At the same time, the opening area of the through-hole 4a formed in the bottom of the housing 4 can be made small, and the amount of heat radiation from inside the housing 4 to the outside can be reduced.

As described above, even if each of the fuel cell devices 50, 70, 80, and 90 according to the first to fourth embodiments repeats a temperature change between a room-temperature state and a high-temperature state, and the fuel cell stack 52 and the like expand and contract in the stacking direction of the unit cells 1, the first elastic member 9 can accommodate a displacement due to expansion or contraction by being compressed or expanded, and a predetermined load can be applied to the fuel cell stack 52.

Thus, the fuel cell device does not suffer from the problem of the difficulty in continuing to apply a fixed load to constituent members of a fuel cell stack which expands and contracts in response to a temperature change, as in, for example, the fuel cell device according to Japanese Unexamined Patent Application Publication No. 2000-340249.

In each of the fuel cell devices 50, 70, 80, and 90 according to the first to fourth embodiments, the first elastic member 9 is arranged outside the housing 4, and the fuel cell device is not configured such that the load applying mechanism 240 is stored in the first housing section 241, unlike the fuel cell device according to Japanese Unexamined Patent Application Publication No. 2006-179288. For this reason, it is possible to eliminate the need for the large first housing section 241 as in the fuel cell device according to Japanese Unexamined Patent Application Publication No. 2006-179288 and achieve device configuration compactification. In the case of a configuration in which the periphery of the housing 4 is covered by the thermal insulator 12, the first elastic member 9 can be arranged in a region at a sufficiently lower temperature than that inside the housing 4. This eliminates the need to use, for example, a heat-resistant, expensive ceramic spring or the like and allows a reduction in manufacturing cost.

In the fuel cell device 70 according to the second embodiment, the first fastening member 7 includes the jut 10 such that a gap between the through-hole 4a formed in the bottom of the housing 4 and the first fastening member 7 is sealed. For this reason, a gap between the through-hole 4a and the first fastening member 7 can be sealed. Additionally, since the first sealing material 13a and the second sealing material 13b provided on upper and lower surfaces of the jut 10 can be compressed or expanded in the stacking direction of the unit cells 1, even when the fuel cell stack 52 and the like expand or contract to be displaced in the stacking direction of the unit cells 1 due to a temperature change, the first sealing material 13a and the second sealing material 13b can accommodate the displacement.

The fuel cell device 80 according to the third embodiment is configured such that the thickness (0.3 to 0.6 mm) of the jut 10 is smaller than that (2.0 mm) of the housing 4. For this reason, even if the position of the jut 10 is displaced due to expansion or contraction in the stacking direction of the unit cells 1 of the fuel cell stack 52, the jut 10 is deformed in accordance with the displacement and can maintain sealability for the housing 4 while accommodating the displacement.

In each of the fuel cell devices 50, 70, 80, and 90 according to the first to fourth embodiments, the second elastic member 11 is provided at a distal end of the second protrusion 8a of the second fastening member 8. However, in the case of a configuration in which a sufficient load can be applied to the fuel cell stack 52 by elastically biasing the second current collector 3 toward the first current collector 2 only with the first fastening member 7, the second elastic member 11 may not be provided at the second protrusion 8a of the second fastening member 8.

The present disclosure can be widely applied to a high-temperature operation type fuel cell system including a fuel cell stack formed by stacking a plurality of fuel cells.

What is claimed is:

1. A fuel cell device comprising:
a fuel cell stack having a plurality of stacked unit cells;
a first current collector and a second current collector which are arranged such that the fuel cell stack is sandwiched between the first current collector and the second current collector in a stacking direction of the unit cells;
a housing which stores the fuel cell stack, the first current collector, and the second current collector;
a conductive first fastening member which is electrically connected to the second current collector, extends from the second current collector toward the first current collector in the stacking direction of the unit cells, and has a first protrusion protruding from inside the housing to outside the housing, the entire conductive first fastening member being electrically connected to the second current collector;
a first elastic member which is provided at the first protrusion of the first fastening member so as to elastically bias the second current collector toward the first current collector via the first fastening member;
a second fastening member which extends from the second current collector toward the side where the first current collector is disposed in parallel with the first fastening member and has a second protrusion protruding from inside the housing to outside the housing;

a second elastic member which is provided at the second protrusion of the second fastening member so as to elastically bias the second current collector toward the first current collector via the second fastening member;

through-holes which are formed in a wall of the housing to allow the first fastening member and the second fastening member to extend through;

respective flanged juts which are provided at the first protrusion and the second protrusion, the respective flanged juts directly contact the first protrusion and the second protrusion; and first sealing materials having elasticity which are arranged between the juts and the wall of the housing, wherein the juts are arranged in contact with the housing via the first sealing materials so as to seal gaps formed between the first and second protrusions and the through-holes.

2. The fuel cell device according to claim 1, further comprising:

a first end member which is arranged on a side of the first current collector opposite to a side where the fuel cell stack is disposed; and a second end member which is arranged on a side of the second current collector opposite to a side where the fuel cell stack is disposed, wherein respective ends of the first fastening member and the second fastening member are coupled to the second end member, and the second end member applies pressure on the fuel cell stack toward the first end member in the stacking direction of the unit cells with force exerted from the first elastic member and the second elastic member via the first fastening member and the second fastening member.

3. The fuel cell device according to claim 1, wherein in the first fastening member, a cross-sectional area of the first protrusion is smaller than a cross-sectional area of a portion inside the housing.

4. The fuel cell device according to claim 1, further comprising:

a thermal insulator which covers at least a part of a periphery of the housing.

5. The fuel cell device according to claim 4, further comprising:

respective insertion holes which are formed in the thermal insulator to allow the first protrusion and the second protrusion to be inserted into; and second sealing materials having elasticity which are arranged between surfaces opposite to surfaces, on which the first sealing materials are provided, of the juts and the insertion holes, wherein the juts are arranged in contact with the thermal insulator via the second sealing materials so as to seal gaps formed between the first and second protrusions and the insertion holes.

6. The fuel cell device according to claim 1, wherein a thickness of the juts is smaller than a thickness of the wall of the housing.

* * * * *